(12) United States Patent
Rueb et al.

(10) Patent No.: US 11,828,711 B2
(45) Date of Patent: Nov. 28, 2023

(54) METHOD AND SYSTEM FOR INSPECTING REPAIR OR ASSEMBLY OPERATIONS

(71) Applicant: VIRTEK VISION INTERNATIONAL, INC., Waterloo (CA)

(72) Inventors: Kurt D. Rueb, Kitchener (CA); Jeff Erbrecht, Waterloo (CA); Beth McAndless, Kitchener (CA); Vincent Tran, Kitchener (CA)

(73) Assignee: VIRTEK VISION INTERNATIONAL INC, Waterloo (CA)

( * ) Notice: Subject to any disclaimer, the term of this patent is extended or adjusted under 35 U.S.C. 154(b) by 94 days.

(21) Appl. No.: 17/497,211

(22) Filed: Oct. 8, 2021

(65) Prior Publication Data

US 2022/0113259 A1 Apr. 14, 2022

Related U.S. Application Data

(60) Provisional application No. 63/089,866, filed on Oct. 9, 2020.

(51) Int. Cl.
*G01N 21/88* (2006.01)

(52) U.S. Cl.
CPC ... *G01N 21/8806* (2013.01); *G01N 2021/888* (2013.01); *G01N 2021/8861* (2013.01)

(58) Field of Classification Search
CPC ....... G01N 21/8806; G01N 2021/8861; G01N 2021/888; G01N 21/8851; G01N 21/8803
See application file for complete search history.

(56) References Cited

U.S. PATENT DOCUMENTS

| 9,200,899 | B2 | 12/2015 | Rueb | |
|---|---|---|---|---|
| 9,245,062 | B2 | 1/2016 | Rueb | |
| 9,881,383 | B2 | 1/2018 | Rueb | |
| 10,052,734 | B2 | 8/2018 | Rueb | |
| 11,110,611 | B2 * | 9/2021 | Häusler | G01N 21/8806 |
| 11,295,461 | B2 * | 4/2022 | Rueb | H04N 9/317 |
| 11,481,915 | B2 * | 10/2022 | Dal Mutto | G01N 21/8851 |
| 2021/0035169 | A1 * | 2/2021 | Bugovics | G01N 21/8806 |

* cited by examiner

*Primary Examiner* — Hung V Nguyen
(74) *Attorney, Agent, or Firm* — Gregory D. Degrazia; MILLER, CANFIELD PADDOCK AND STONE (57) ABSTRACT

A method of identifying an item on a surface of a workpiece is disclosed. An optical device identifies an item on the surface of a workpiece. An item identification system includes a light projector and a photogrammetry system. One of the light projector and the photogrammetry system generates a three-dimensional coordinate system within the work cell. One of the light projector and the photogrammetry system identifies a location of the surface of the workpiece within the three-dimensional coordinates system. The controller calculates geometric location of the item on the surface of the work piece in the three-dimensional coordinate system as identified by the optical device. The controller signals the light projector to project a beam of light onto the surface of the workpiece identifying a disposition of the item disposed upon the surface of the workpiece.

10 Claims, 6 Drawing Sheets

Fig-7

METHOD AND SYSTEM FOR INSPECTING REPAIR OR ASSEMBLY OPERATIONS

PRIOR APPLICATIONS

The present application claims priority to U.S. Provisional Patent Application No. 63/089,866 filed on Oct. 9, 2020, the contents of which are included herein in entirety.

TECHNICAL FIELD

The present invention relates generally toward a method of identifying items on a surface of a workpiece disposed in a work cell. More specifically, the present invention relates toward using a laser projector to project a laser image onto a surface of a workpiece for identifying an item, such as, for example, a defect and status of work performed by an operator on the item.

BACKGROUND

Efforts to automate, for example, automotive vehicle assembly and other mass production endeavors have advanced significantly. Various technology has been implemented to assist operators by providing automated instructions for performing work functions. However, automated identification of defects that do not satisfy specification requirements while also directing an operator where to perform a repair or other work function has proven elusive. A problem associated with automated identification of items, such as defects is the high pace of mass production using, for example moving assembly lines. One non-limiting example is identification of paint defects at an end of assembly or just after paint processing. For example, once a car body has been painted it is transferred via moving assembly into a brightly lit inspection booth. There, inspectors visually monitor for paint or vehicle body defects and either repair the defect or mark the defect for a later repair after the vehicle has been fully assembled.

This process is difficult and subject to human error. Often the paint defects are quite small being only a particle disposed in a clear coat, a small sag of paint or a crater. Even the most skilled operators have difficulty locating these defects and often the defects are never identified. This is further problematic because the defects are randomly disposed on the painted vehicle body. Further, these defects are not tracked, which would provide the ability to identify trends. Therefore, it would be desirable to provide an automated inspection process for identifying paint defects on a vehicle body or other painted object. While vision technology has existed that is capable of identifying a paint defect, translating this information to an operator for making necessary repairs has prevented implementation. Known vision technology capable of identifying paint defects is located a distance from a work cell where the defects are repaired. During transfer of the vehicle body to the work cell the location of the defects must be identified in a new coordinate system unique to the work cell while meeting the challenges of mass production. Thus, the need is for not only identifying a defect, but for signaling location and disposition of the defect to an operator must be developed.

SUMMARY

A method and system for identifying an item on a surface of a workpiece transiting a work cell is disclosed. An optical device identifies an item on the surface of the workpiece. The optical device signals a controller that an item has been identified. The controller signals an item identification system that includes a light projector and a photogrammetry system. The light projector or the photogrammetry system generate a three-dimensional coordinate system within the work cell. Alternatively, both the light projector and the photogrammetry system cooperatively generate a three-dimensional coordinate system within the work cell. Once the three-dimensional coordinate system is established, the light projector identifies a location of the surface of the workpiece within the three-dimensional coordinates system. The photogrammetry system may also be used to locate the surface of the workpiece within the three-dimensional coordinate system.

The controller calibrates the location of the worksurface within the three-dimensional coordinate system with the identified item. Once calibrated, the controller calculates a geometric location of the item on the work surface in the three-dimensional coordinate system as identified by the optical device. The controller then signals the light projector to scan a beam of light onto the surface of the workpiece identifying a disposition of the item disposed upon the surface of the workpiece.

The system of the present invention for the first time allows an operator to focus on repairing paint or other defects without having to first locate the defects. Further, because the system identifies disposition of the defect, the location and whether the defect has been repaired is also provided by way of visualization of disposition on the surface of the workpiece.

One approach to achieve this objective is to display an assembly task information onto the surface of a workpiece. This is achievable though the use of a conventional video projector projecting a raster image on the surface, but which could be limited by the relative brightness, accuracy and precision of the display and flexibility for interaction with an operator. Alternatively, a vector display where a laser spot projected from a laser source is sequentially traced through a pattern can provide unique capabilities. For example, directing a 1 mW laser spot onto a 1 mm$^2$ area would require a Kilowatt projection source if delivered by a raster projector covering a 1 m$^2$ area.

Alternatively, a conventional raster laser technology project a laser image with sub-millimeter accuracy over areas covering multiple square meters. The primary requirement for clear laser projection is to provide a clear, flicker free laser projection optimized for precise placement of laser images on a surface of a workpiece. To provide the accuracy required, the location of a workpiece is often identified with accurately measured reference targets that can be used by the projection system to establish the relative position necessary to provide the required precision and accuracy.

The method of the present application does not necessarily require accuracy and structure associated with layup template projection. The order that tasks of the present invention may be completed in a sequence selected by an operator. Often, multiple operators may act in concert to complete an overall task, such as, for example verifying defects of a vehicle paint application been identified and repaired. Consequently, rather than project steps in sequence, it is desirable to simultaneously present a large suite of potential operations to allow completion in any order. However, it is still essential to ensure that the task is complete, that all fasteners have been inserted or all defects in the paint finish have been repaired. Thus, traditional approaches for template laser projection would not suffice in this circumstance.

As will be explained further herein below various laser projection technologies are believed viable for meeting these demanding criteria even if not necessarily structured to perform the process of the present invention. One such example is U.S. Pat. No. 9,200,899 Laser Projection System and Method that discloses various techniques to located objects in a three-dimensional coordinate system using cooperative photogrammetry systems and laser projectors. Another is U.S. Pat. No. 10,052,734 Laser Projector with flash Alignment that discloses techniques for rapidly locating targets for establishing a geometric relationship between a workpiece and a laser projector. Still further is U.S. Pat. No. 9,881,383 Laser Projection System with Motion Compensation and Method that discloses techniques for detecting dynamic movement of an object in a three-dimensional coordinate system. Another is U.S. Pat. No. 9,245,062, Laser Projection System Using Variable Part Alignment that discloses improved accuracy when projecting laser images on a workpiece that has not been manufactured to design intent. The contents of each of these patents are included herein by reference for brevity of the present application.

Rather than perform traditional step by step process disclosed in these references, a new process for both laser identification and location of various items on a surface of a workpiece is disclosed. Random sequencing is established providing an operator an ability to determine an order of sequence. Further, multiple operators are provided the ability to simultaneously perform work functions in no particular sequential order. All this is coordinated by the controller and item identification system of the present invention while verifying tasks have been completed and notifying an operator of such completion.

In the system of the present invention visibility of laser projected images becomes more relevant than clarity. Thus, it is not necessary to have finely focused flicker free projected image, even when the task is being performed in a brightly lit cell as is typical of an inspection booth. The precise location is of less consequence as the location of a bolt to be placed is constrained by the threaded hole, while repair of a defect in a painted finish only requires a location sufficient to assist in recognizing the defect itself and visibility is more desireable than the clarity of the projected pattern.

The visibility of a projection is generally a function of the total amount of energy divided by the apparent perimeter of the feature or laser image. If more features, for example, a complete set of bolt locations are presented simultaneously without flicker, the apparent brightness may decrease linearly with the total projected length of the outline of the projection. Traditionally, a decrease in apparent intensity is countered by increasing the instantaneous laser power so that the overall energy and visibility is increased. From a safety standpoint, practical and regulatory concerns accept that the thermal energy from the laser exposure will dissipate over time. If a given area of a projection is exposed to the retina of the eye in half the time, regulation limits the power to an increase of 20%, whereas an equivalent energy and hence visibility would require a doubling of power. This diminishing essentially limits practical visibility if flicker free projection is desired.

On the other hand, if flicker free projection is not required as in the present invention, an optimal energy dose for desired visibility may be evaluated. To provide safe operating conditions, use of a Class 2 laser projection system is often required. For Class 2 operation, the eye may be exposed to a 1 mW laser source for 0.25 seconds. For periods from about 50 milliseconds to 0.250 seconds, increased duration of exposure simply appears perceptually longer has no apparent increase in visibility for a given instantaneous laser power level. According to the Class 2 specification, the acceptable emission level (AEL)=7×10-4 t0.75=75 µJ, which is equivalent to about 1.5 mW laser power. This quantity of energy distributed over a minimum perimeter provides optimal visibility, subject to the restriction that beyond certain distances smaller patterns will become harder to distinguish on the basis of limits on visual acuity. Providing an indicator with optimum visibility to identify the location of an operation becomes a balance between minimum size or energy concentration and the typical expected distance from the operator.

The adverse effect of this approach could be that flicker will be extreme. A period of 50 milliseconds equates to refresh rate of 20 Hz. Therefore, if 20 flaws are being simultaneously displayed, each flaw will flash on and off once each second. While not an optimal result in terms of clarity and quite frustrating if being used as an alignment guide, when used as an indicator of a location, it has proven ideal. In practice, the flashing of the indicator also triggers the motion receptors in the periphery of the vision of the eye, which significantly enhances an operator's ability to locate the displayed indicators. This effect is so beneficial, if too few indicators are displayed, especially a single indicator, or exposure time for each indicator is too short, an extra blanked delay is introduced to create an optimal flash effect to maximize visibility for an operator.

Thus, the system and process of the present invention provides an operator with a maximized visible icon that is indicative of both a task to be performed and completion of that task. While simply providing clearly visible indicators at the location of desired operations can guide the operator to the desired location, the overall process is uncontrolled unless feedback on task results is also provided to the operator. To direct the current state of the process task, it is possible to provide feedback based on the shape and visibility of the projected icons. The shape of different laser projected icons can be used to indicate the type of bolt to be fastened or the state of a repair. For example, an icon associated with a defect can cycle through a sanded, polished, and finished states to indicate an operator's progress in repairing an individual defect. In particular, once the repair of a defect is finished, the shape of an icon can be changed to indicate completion and flicker can be eliminated so as to not draw attention to that icon.

BRIEF DESCRIPTION OF THE DRAWINGS

Other advantages of the present invention will be readily appreciated, as the same becomes better understood by reference to the following detailed description when considered in connection with the accompanying drawings, wherein.

DETAILED DESCRIPTION

Figure 1:
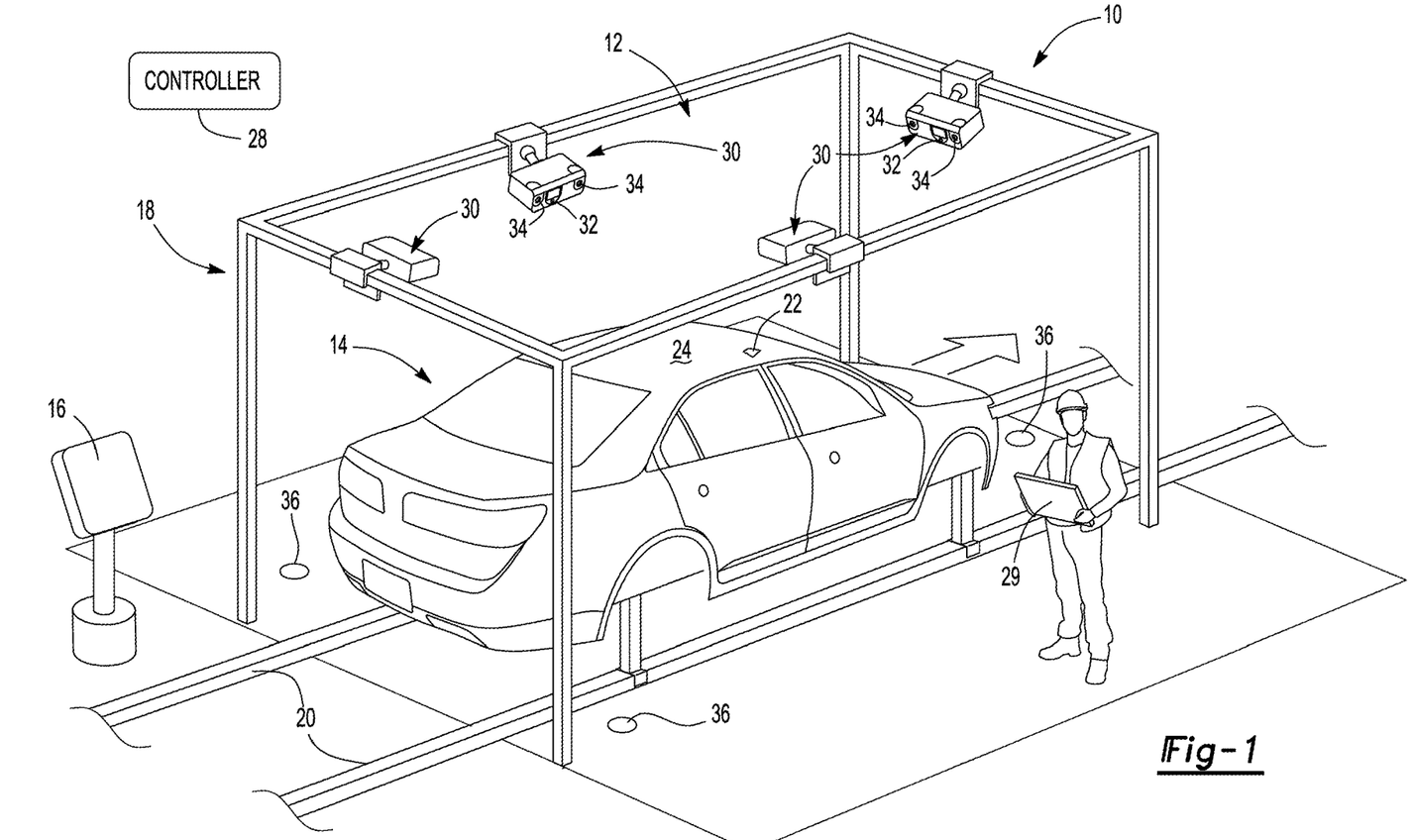
FIG. 1 shows a perspective view of a work cell in which repairs are performed upon a vehicle body.

Referring to FIG. 1 a system of the present invention is generally shown at 10. The system 10 is integrated with a work cell also known as a booth 12. In this embodiment, the work cell receives a vehicle body 14 after application of a paint coating in which inspection of the paint coating is carried out. However, it should be understood that the work cell 12 may be used for any work function including body-in-white inspection, component inspection, component application, and any other function in which inspection and identification may take place as will be understood further herein below.

The system includes an optical device 16, in one embodiment mounted at an entry 18 to the work cell 12. However, it should be understood that multiple optical devices 16 may be included, if for example, multiple vehicle bodies 14 are disposed within the cell 12 or if the vehicle bodies are on a moving conveyor 20. The optical device 16 includes high precision imaging optics and can be provided by Micro-Epsilon's ATENSOR-LS1 technology. The optical device 16 identifies items 22 disposed upon a surface 24 of the vehicle body 14. As set forth above, the optical device 16 detects imperfections or defects (items 22, see FIG. 1) in the paint coating of the vehicle body 14 such as, but not limited to dirt, scratches, craters, sags, and the like relieving an operator from having to conduct a visual or manual inspection. In one embodiment, the items 22 are identified by the optical device 16 in an alternate location prior to the vehicle body 14 entering the inspection booth or work cell 12. Once identification of the items is complete the vehicle body is placed on transfer conveyor and moved to the cell 12.

The optical detector 16 is electronically connected to a controller 28 for signaling the controller 28 indication of an imperfection (item) 22 in the paint coating. In addition, the optical detector 16 signals the controller 22 vehicle model and chassis number. As used herein, electronically connected means physically wired or wirelessly transmitting via WIFI, Bluetooth or equivalent technology. For simplicity, physical wiring is not shown in the Figures. However, proper identification of the items 22 on the surface of the vehicle body 14 requires recalibration of the vehicle body 14 in a three-dimensional coordinate system relative to the work cell 12. The controller is electronically connected to an item identification system 30 that includes a laser projector 32 and a photogrammetry device 34. It should be understood that any light projector or projection system that projects a beam of light mays suffice. However, for brevity "laser projector 32" will be used throughout this specification. In one embodiment, the system 10 includes a plurality of laser projectors 32 spaced around the booth 12. Four laser projectors 32 are located above the vehicle body 14 in a position that enables laser projection onto every exterior surface of the vehicle body 14. Alternatively, a fifth laser projector 32 is located directly over the vehicle body 14 for providing laser projection onto the horizontal surfaces of the vehicle body 14. It should be understood that any number projectors 32 and photogrammetry devices 34 may be included to provide projection each of the surface of whatever object is disposed within the booth 12 for inspection. Further, the laser projector 32 and photogrammetry device 34 may be integrated into a single unit or separately located.

The system 10 of the present invention provides the ability to indicate a location or task to be performed on a workpiece, such as a vehicle body 14 even when the vehicle body 14 is transiting the cell or booth 12. These include presence of rivets, repairing an identified defect in a painted coating or substrate, placing fasteners used to route wiring or installing bolts or screws at desired locations. Thus, the item identification system 30 is adapted to also generate a three-dimensional coordinates system within the booth 12 and locate the vehicle body 14 within that coordinate system.

Traditional optical template projection aligns projected patterns to a part or layup tool by scanning targets mounted on the tool with known locations specified in the coordinate system of the CAD model of the layup tool. Using a process known as resection, the scan angles to each target and the corresponding coordinates of the targets can be used to calculate the 3D position and orientation of the projector relative to the tool, and this in turn is used to calculate the scan angles to project through the required 3D coordinates to trace the template pattern. Each projector must have a sufficient set of these targets in the field of view of the projector to be located relative to the tool.

For the applications suited to the method of the present invention, it may be impractical to apply retro-reflective targets to the vehicle body 14, when inspecting the painted finish of a part, much less support the overhead of precisely measuring those target locations. In addition, it is often necessary to have the projection field the surfaces of the part from all directions thus requiring multiple item identification systems 30 being spaced around the booth 12.

Figure 2:
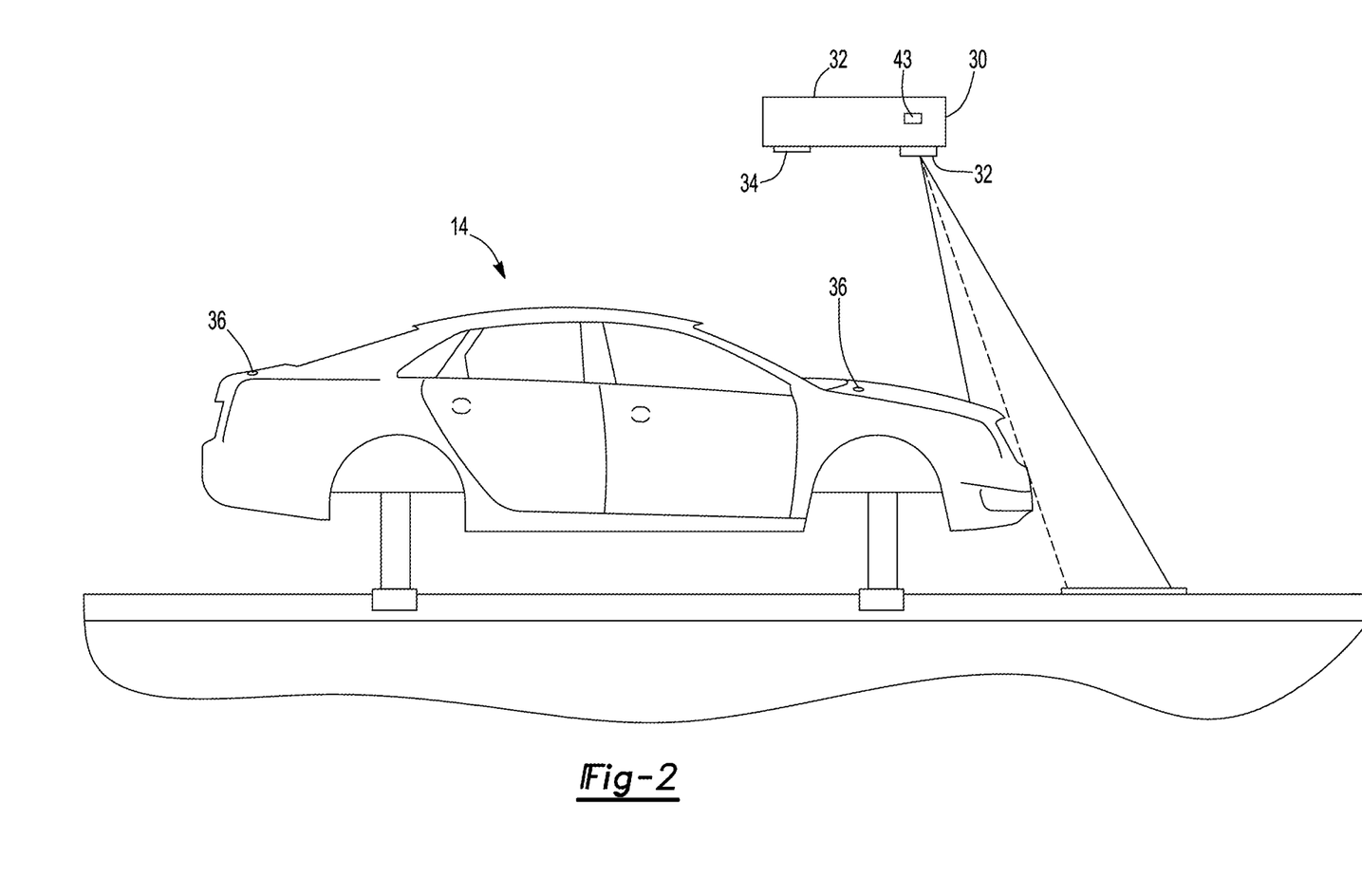
FIG. 2 shows a side view of the work cell us in which inspection and repairs are performed upon a vehicle body.

To support such desirable attributes, the laser projectors 32 are configured in the work cell or booth 12 to surround the vehicle body 14 from all sides. As represented in FIGS. 1 and 2, a plurality of five projectors 32 surround all sides of the vehicle body 14 in the work cell 12.

To establish accurate projection by the laser projectors 32, the location of the laser projectors 32 within the three-dimensional coordinate system is established by placing reflective targets 36 inside the booth 12 at arbitrary locations. Alternatively, the targets 36 may be placed at known locations in the booth 12. In one embodiment, the plurality of photogrammetry devices 34 first locate the targets 36 in the cell after which a more accurate location is identified using the laser projectors scanning the targets 36 and an integrated laser sensor 43 detecting the reflected laser light. In this manner, a common reference frame is established inside the cell 12 in which relative position of all of the laser projectors is established in the three-dimensional coordinate system.

Figures 3, 4:
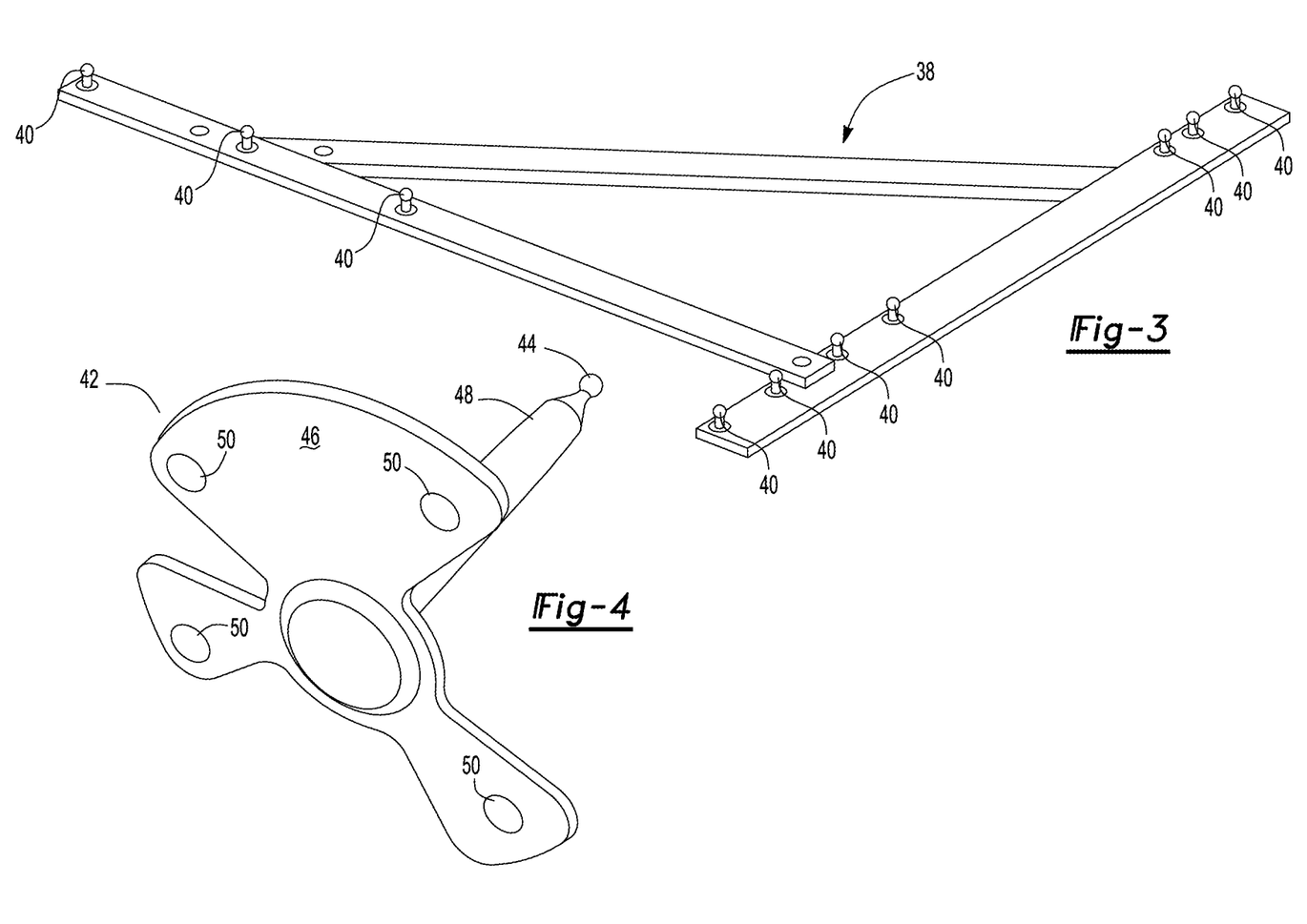
FIG. 3 shows a fixture used for calibrating a three-dimensional coordinate system within a work cell.
FIG. 4 shows a handheld probe used for identifying location of a feature on a work piece

To allow standardization between different work cells 12 in a factory, a standardized reference frame is established by placing a known reference fixture 38 at a defined location in the cell 12. One configuration of the reference element 38 is shown in FIG. 3. The reference fixture 38, in this embodiment takes the form of a triangular frame. However, other shapes may also suffice and within the scope of this invention. A plurality of reflective reference targets 40 are spaced along the reference fixture 38. In this embodiment, the targets 40 are spherical retro-reflectors allowing reflection of a laser beam from any direction back toward the laser projector 32 to the laser sensor 43 in a known manner.

To create an integrated three-dimensional reference frame within the booth 12, laser scans by the laser projector 32 are produced measuring the 3D location of the targets from each of the spaced laser projector 32 positions and then merged into a common reference frame by the controller 28 by recognizing similar subset of target 36 positions. If specified, the reference fixture 38 will act as a master and all target 36 locations will be transformed into the coordinates system of the fixture 38.

After the laser projectors 32 have surveyed the targets and the controller 28 has located them in a common three-dimensional coordinate reference frame, each projector 32 can use the reference targets 36 to establish and update the position of the projector 32 within the work cell 12, or more particularly within the common three-dimensional coordinate system. If a projector 32 has an integrated photogrammetry system 34, such as the VPS1 projector from Virtek Vision International, any projector 32 can then be repositioned in the work cell 12 and automatically recognize the subset of visible targets 36 and recalibrate its location in the work cell 12 by imaging the targets 36.

Once the three-dimensional configuration of the work cell 12 has been established, the projectors 32 can be configured to cover all surfaces of the vehicle body 14. Therefore, even if a projector 32 is moved, the projector 32 is automatically recalibrated within the work cell 12 using at least one of the laser projector 32 or the photogrammetry device 34. However, to project accurately, it is still necessary to determine the location of the vehicle body 12 or other work piece as the case may be. In one embodiment, this is achieved using traditional approach of placing reference targets 36 on the vehicle body at predetermined locations. The system 10 can then recognizes the configuration of targets associated with the vehicle body 12 to provide accurate laser projection. When the work cell 12 configuration has been established in a three-dimensional coordinate system with each projector 32 being located therein, each projector 36 need not have a view of all of the targets 36 to accurately project a laser image onto the surface of the vehicle body 14. In this case, the controller 28, having already calibrated a location of each projector 36 relative to the other projectors 36, a disposition of the vehicle body 12 is still recognized so long as a sufficient number of targets are visible to the group of projectors 32.

In some instances, it is not practical to provide accurately measured target 36 locations on a vehicle body 14. In this case, an alternative embodiment is established where the location of the vehicle body 14 can be determined through measurement of the features of the body 14 itself, such as, for example, hood edge, door frame, identified aperture and the like. For systems 10 with an integrated metrology determination capability such as the VPS1 projector, features can be measured using an optically tracked mechanical probe 42 as shown in FIG. 4. The probe 42 includes a contact ruby ball tip 44, in one embodiment having a 6 mm diameter. The tip 44 is connected to a probe face 46 by a shaft or grip 48. Various probe face 46 configurations are recognized by the system 10 by way of a pattern of retro-reflective dots 50 pre-arranged on the probe face 46. In this way a given probe 42 may be used to identify a location of a given feature on the vehicle body 14. The probe 42 projector is also useable for taking measurements on different surfaces of the vehicle body 14 to establish surface of body 14 position. To locate the probe 42, the laser projector 32 scans the face 46 of the probe 42 so that the retro-reflective dots 50 reflect the laser beam to the light sensor 43 in a known manner. In this embodiment, an operator can direct a measurement cursor on a controller screen 29 to a desired location to measure a specified feature of the vehicle body 14.

However, in some instances, it is not efficient for an operator to manually identify features using the probe 42. As a further alternative embodiment, a method of automatically measuring the location of the vehicle 14 position in the three-dimensional coordinate system was developed. In this embodiment, a series of alignment steps are implemented that sequentially establish the position of the vehicle body 14. The alignment steps consist of two basic components, transforms and measurements. It is believed that the use of transforms as opposed to using only datums provides sufficient accuracy for the purpose of identifying disposition items 22 on the vehicle body 14 surface. However, the use of datums can contribute to the registration accuracy as is explained further hereinbelow.

As used herein, a "transform" represents initial positions of the body 14 and the relationships between subsequent or spaced positions of the body 14. For example, a rough alignment position or first transform could establish the expected general position of the part, in one embodiment using the photogrammetry device 34. A derived initial position could be based on measurements taken to refine the first transform 58 based on laser scans of the vehicle body 14 guided by the initial general alignment position to establish a second transform 60 that is more accurate than the first transform 58. Other defined transforms can define constrained relationships such as movement from the initial position on a lift table, translated on a slide mechanism or moving conveyor and even pivoting on an axis, which could provide accurate measurement of a door surface when opening or closing on a hinge.

Measurements are associated with a specific or first transform 58 to establish the position or constrain the position of a derived or second transform 60. First transform 58 measurements are nominally specified three-dimensional coordinates based on known work cell constraints that are obtained by optically tracking the probe 42, scanned by triangulating the laser spot position within the work cell 12, or by triangulating visual image features such as holes using the photogrammetry device 34. Optionally measurements are defined rays, that 'pin' the location of the vehicle body 14 that establish an image ray through a visual image feature or obtained using the laser by detecting the silhouette of a projected light stripe against a boundary of the part as represented in FIG. 2. In this embodiment, a projected light pattern 52 is scanned over a retro reflective patch 54 placed strategically in the work cell to enhance contrast. The reflective patch 54, in one embodiment, is placed upon a floor or moving conveyor that is scanned by the laser projector projecting a light stripe or other light pattern first over an edge 56 (such as hood or deck lid) of the vehicle body and subsequently over the patch 54. In this manner, the laser projector 32 detects the edge 56 of the vehicle body 14 for the controller 28 to calculate the first transform 58.

Transforms and their associated measurements are combined in a hierarchical structure based on the defined transforms. If a second transform 60 is a 'child' of another transform, it is derived from the parent or first transform 58, subject to a possible location transformation such as a translation provided by a conveyor, lift table, or rotation around an axis resulting from rotation around a hinge or movement of a mandrel. The hierarchical structure provides increasing levels of location accuracy of the vehicle body 14 even when drift or other movement occurs.

Figure 6:
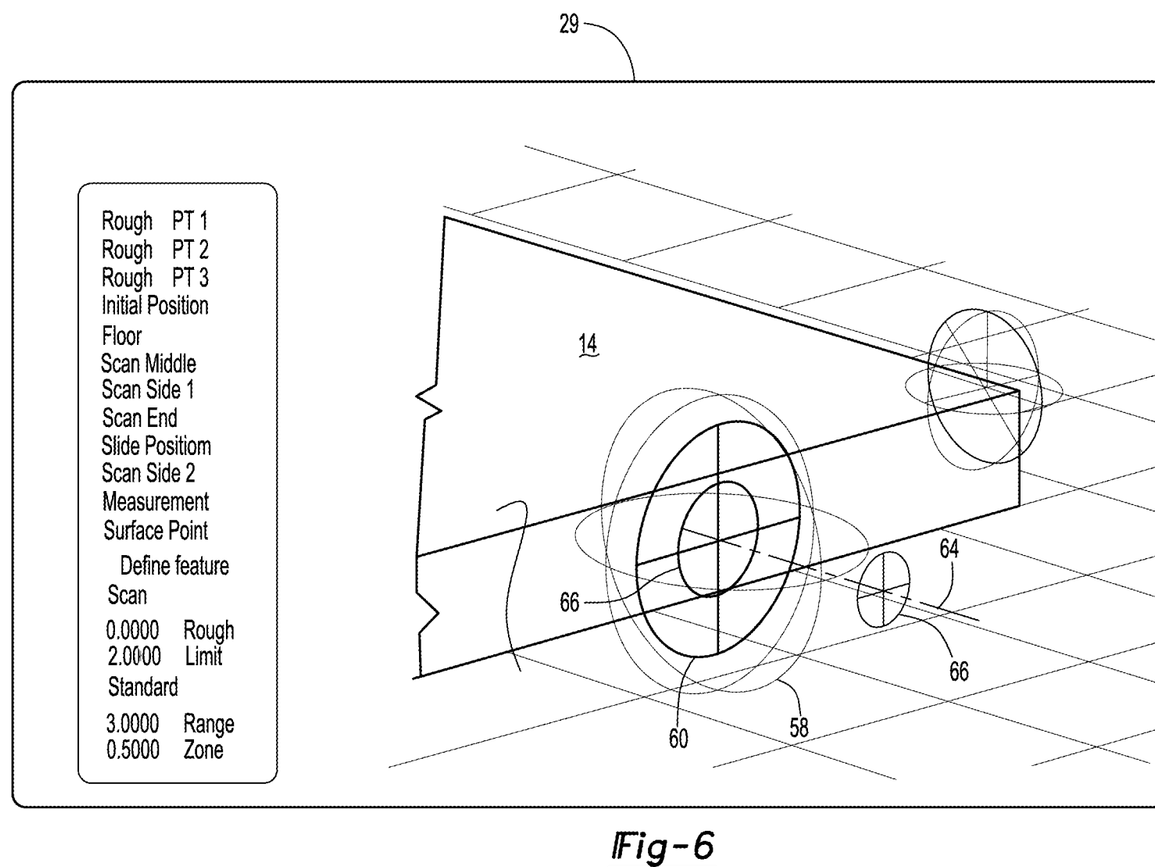
FIG. 6 shows a controller screen with identified transforms.

Referring to FIG. 6 rough tolerance can be applied to any measurement that explicitly allows more-or-less unhindered movement of the vehicle within the tolerance without penalizing the alignment. For example, a first transform 58 may be established that is indicative of the expected approximate position of a vehicle body 14 within a work cell 12 with a tolerance of a few inches. The measurements defining this position, perhaps measured initially with a probe, or based on general knowledge of how the workpiece is delivered, can guide the location of a more precise second transform 60 of an actual workpiece placement. The measurements of the precise transform are applied in sequence guided by the initial transform applying the constraints of each additional measurement provided the rough tolerances of the first transform 58 are not exceeded. The rough alignment value representing the first transform is represented in FIG. 6 by the outer sphere around the point.

In addition, there is a limit tolerance for each measurement that will limit the effect of transform measurements that are excessively out of position. For example, the controller will recognize if a scan hits entirely the wrong surface. The alignment limit is defined by the sphere representing the first transform 58. The more accurate second transform 60 is represented by the smaller sphere shown inside the larger sphere defining the first transform. If the measured position of the second transform 60 is outside the sphere defined by the value, any additional impact on alignment is made minimal.

To illustrate the method of the present invention, a non-limiting example is now provided. A sample vehicle body 14 is roughly located in the work cell 12, and then constrained to an initial position based on the measurement of the floor as represented by the grid shown in FIG. 5. Sequential scans to establish a fix on the position of the body 14 in the work cell 12 and therefore, in the established three-dimensional coordinate system. The translations of the vehicle body 14 in a given direction, for example along a vehicle axis or slide direction 65 is updated using a single scan at one end of the body 14 is represented in FIG. 6 where a computer-generated image of the scan is represented on the controller screen 29.

The initial position of the first transform process is established by three probe measurements Rough PT 1, Rough PT 2, and Rough PT 3, using rough tolerances of eight inches to allow variations in the placement of the vehicle body 14. The derived position transform 'Initial Position' is established by a floor reference plane measured with by initially measuring the surface of the floor by the laser projector 32 scanning placed targets 36. This step need not be repeated with introduction of every additional vehicle into the cell 12. A sequence of scan measurements to determine the orientation of the vehicle 14 on the surface is then made. Each additional measurement further geometrically limits the position of the body 14 within the work cell 12, and therefore within the three-dimensional coordinate system.

A scan measurement of the vehicle body 14 is performed automatically by the system once the body 14 is established within the work cell 12. Similar to the nominal and probe measurements, a scan measurement also uses rough and limit alignment values, i.e., establishing a first transform 58 and second transform 60. With all scan measurement types, a range and zone can be specified. Range specifies where the system can search for a measurement target. The controller 29 directs a search of specified distances in both directions from the nominal value as would be understood from CAD data. A zone gives the radius around the nominal position where a measurement is found acceptable. The final scan in the sequence 'Scan Side 2' is shown in FIG. 6. In this example, a location of a specified surface point 62 is measured. A vector 64 extending outwardly from the surface point 62 indicates the range specified for the measurement. The zone defines the acceptable position for the measurement and is shown by the two disks 66 at the ends of the range line. Setting a tight tolerance for the zone allows very specific areas on a part to be measured.

A 'slide position' transform 65 used to determine a final translation along the length of the vehicle body 14 in a single direction. All other constraints on the vehicle body 14 are specified by an 'initial position' so a single scan measurement at a slide end 68 of the body 14 can update any position in the direction of the slide. In the non-limiting example shown in FIG. 5, the slide can adjust from the middle position by +/−10" and is currently positioned at −3.2518" as a non-limiting example.

Figure 5:
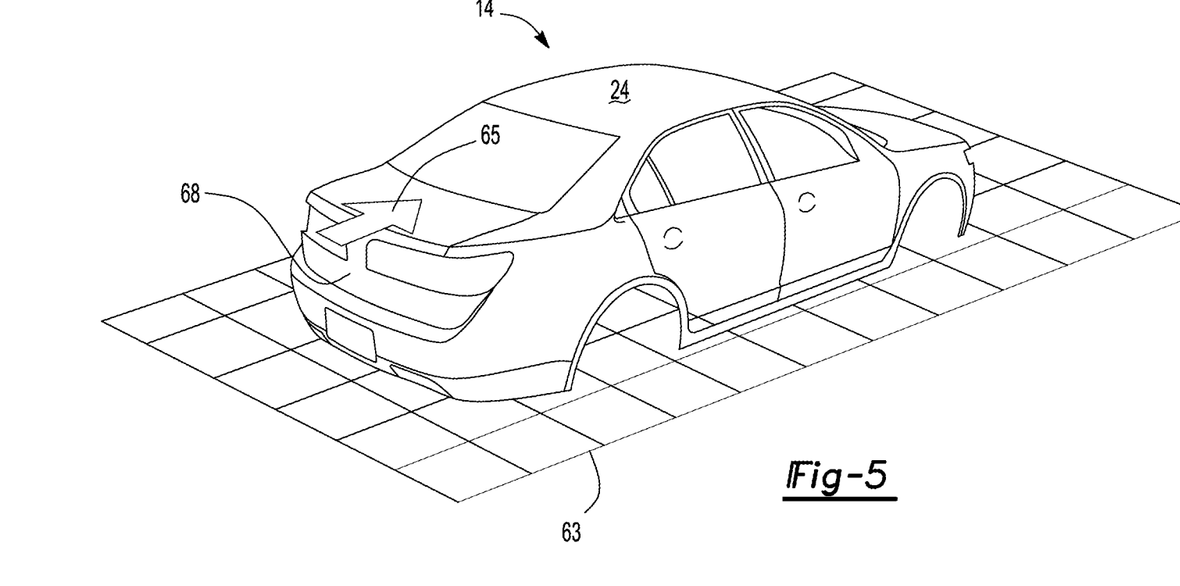
FIG. 5 shows a vehicle body located in a three-dimensional coordinate system.

The slide end measurement that determines the current position of the slide is defined with a drift check interval that periodically measures the end position and adjusts the position of the slide as required. The methods defined herein can be used to locate any object within the work cell 12 providing necessary degrees of accuracy for a particular work function such as repairing a paint defect. For example, as shown in FIG. 5, locating the position of the vehicle shown in the work cell 12 is based on the definition of the floor and scans of the car surface; a scan measurement on the side of the side of the car is highlighted for example.

This implementation provides an alternative to datum alignment as currently implemented in motion compensation disclosed in U.S. Pat. No. 9,881,383, the contents of which are incorporated herein by reference. However, transform and data alignment are selectively done in parallel so that both methods of alignment are available.

In the existing, implementation a number of digital alignment polygons are defined. The operator can initiate measurement by cycling through each datum polygon through keyed initiation on a computer keyboard and take measurements with a probe though separate keyed initiation. Optimizing the measurement process is achieved by determining the position of the vehicle body 14 in the cell 12 to minimize the overall error between the measurements and the associated digital alignment polygon. An operator can also select arbitrary polygons instead of single edge polygons for example. Optimization occurs whenever a new measurement is taken. Improvements can be made for automotive applications, where we have an initial position for the car and then it is moved vertically on the lift table or in slide direction. Recalibration is achieved through additional measurement for drift check or motion compensation.

In validating the system 10 and method of the present invention an initial position of the vehicle body 14 was established by specifying 'rough' datum features on the vehicle body 10 that were measured by the probe 42 as described above. The measurement was made while in the vehicle lift was disposed in a lowered position. This measurement data was essentially 'kludged' by firstly optimizing only rough datums (typically three datum points) on the vehicle 14. Three datums establishes approximate position of the vehicle 42 in the three-dimensional coordinate system providing sufficient stability for the controller 28 to calculate geometric location. Once calculated, the system is able to extrapolate the location of any additional measurements. Mathematical alignment by assigning a lower weight to measurement errors is followed by addition of more precise measurements. However, if the additional measurements are off by a significant amount, they can pull the position completely out of the initial alignment making the system accuracy unusable and recalibration is required.

In one embodiment, a more flexible datum identification process is provided. Two components to the proposed process include the use of transforms and performance of datum measurements. 'Transforms' represent positions of the vehicle body 14 in the three-dimensional coordinate system and relative position between transforms. Therefore, the 'rough' alignment of the vehicle 14 in the three-dimensional coordinate system can be optimized using a first transform 58 and represented separately from one or more second transforms 60 derived from the first transform 58 enabling relative relationship to be defined between a plurality of transforms.

As used herein, a datum measurement is measurement of a specific datum feature on the vehicle body 14 and is explicitly referenced relative to the associated transforms. For example, three datum measurement points would be associated with the initial rough alignment or first transform that is calculated. Rather than having explicit 'rough' datum types, a tolerance can be applied to any datum that explicitly provides for more-or-less unhindered movement within the tolerance range (with a small bias equivalent to small threshold optionally set to 0.010" that will center the datum if not countered by other measurements).

Transform and datum measurements are combined in a hierarchical structure based on the previously defined transforms. If a second transform is a 'child' of another or first transform, the second transform is derived from the parent transform, subject to a possible transition such as a conveyor or lift table, and all datum measurements and tolerances of the parent transform must also hold with respect to the vehicles disposition in the coordinate system.

Special alignment process steps are mixed in with the projections of icons to be displayed on the surface of the vehicle body 14. Editing the hierarchy is achieved using process editing functionality, where each step can be defined as a projection step, transform, or datum measurement. Extra information required to indicate tolerances, the type of datum, what method is being used to take measurements (target or probe), lists of measurements, the current position of the lift table, etc. exist as required in the interface.

A root process of the process tree becomes by default the root transform in the hierarchy; although, any sibling transforms will have independent positions. Any datum measurement siblings of the transform or descendants of the transform, until another transform are reached, will be applied to constrain the transform. Any descendant transforms of a transform or its datum measurements, will also be derived from the parent transform and must also meet the requirements of any associated datum measurements. Siblings of a transform are mutually independent but are all are dependent on the common parent transform. In a similar manner, any sibling or descendant projection process steps of a given transform would have their position determined by that transform.

Implementation of the invention of the present application provides complete definition of the transform/datum hierarchy but measurement is particularly facilitated through use of the probe. Alternatively, the inventive process provides 'nominal' directly entered measurement values, manual measurements by selecting in an image, selection with a laser, intersection with a laser ray, etc.

A root transform on a workpiece or vehicle body 14 is specified by three datum points being measured with tolerances ranging from two inches to four inches in one embodiment. A next level of measurement includes an initial position datum that tightly constrains the position using datums established by features on the surface, with a final transform level providing a transform determined by sliding the workpiece horizontally with the location determined by an end point datum measurement.

In an interface, identification of the three rough datum points establishes the rough position of the surface of the vehicle body 14. A derived 'Initial Position' is established by measurements of a point and two edges of the vehicle body 14. Subsequently, a slide transform is defined based on the normal of a specified plane with the vehicle body 14 position defined by the end point datum measurement. When the slide transform is actively measured the optimized current slide position is represented. Clearing the end probe measurement on the controller moves the slide position back to the initial position.

Two types of position process steps are contemplated, one with a feature type, "none" and the other with the feature type "parallel plane". With feature type "none", the sibling transform steps following this step define the position. For example, the default step, is a Position with None defined for the feature type. It is typically followed by three measurement points each with a large rough tolerance that combine to define the approximate position of the part. With the feature type parallel plane, a position that can move in a single direction is specified, perpendicular or normal to the defined plane.

The controller screen 29 is interactive for the operator. Therefore, position steps may be added as part of a position identification scheme. The following sets forth a sequence of procedures to add a position step:

1. Click a Create new step button to enable Step editing controls.
2. Type a unique, descriptive name in the Step name box to identify a measurement point.
3. Select Position for the type of process step. Controls become visible based on the feature type selected.
4. Select the feature type (None or Parallel plane).
a. If operator selected None, continue on to step 5.
b. If operator selects Parallel plane, proceed with the following steps:
c. Define the parallel plane that will be used for this process step.
d. Specify the values for the Minimum and Maximum range of movement for the plane. Movement is in the direction perpendicular to the plane.
5. Select the step in the Process list where the new step should be added after, as either a sibling or a child.
6. Add the new step as a sibling or child step by clicking the appropriate button.

Measurement process steps are used to make measurements on the physical part of the vehicle body 14 in order to align the part with the mathematical model. These step enhances ability for laser projections to be accurate. Four types of measurement features are included in the process of the present invention: Nominal point, Nominal line, Surface point and Plane. Nominal features use a measured point to align to specific locations. With a Surface point, alignment is established by only using how close the measured point is to the surface where the point is defined. With a Plane, alignment is achieved by measuring three points on a plane.

Three types of measurement methods are included: nominal, probe, and scan. Nominal and probe are established for identifying all feature types on a workpiece, but scan may only be used to identify surface points.

Nominal and probe measurements are used to measure specific locations on a part of the vehicle body 14. Nominal measurements require the user to manually specify the location of the point or plane. Nominal measurements are optimally used when the location desired for measurement is known relative to the three-dimensional coordinate system of the work cell 12. For example, a location on a fixture that is part of the math model or a reference plane that is the floor. For a Nominal point, Nominal line or Surface point, a measurement is added by manually entering the x, y, z coordinates for the point. For a Plane, values for three points on the plane must be entered.

Probe measurements use a probe to measure a point or points as is explained herein above. With a nominal or a probe measurement, you can specify a Rough alignment tolerance and an alignment Limit. For a Rough alignment value, the measured position can be anywhere within the sphere defined by the value, without having any impact on the alignment. As is set forth above, rough alignment value is shown in FIG. 6 by the sphere around the point.

For an alignment Limit, if the measured position is outside the sphere defined by the value, any additional impact on alignment is minimal. The alignment Limit is also represented as a sphere. It should be also be understood that two alignment values can be used simultaneously.

A scan measurement is performed automatically by the system. However, only surface points can use the scan measurement type. Like nominal and probe measurements, a scan measurement also uses rough and limit alignment values. With scan measurements, the scan measurement type can be selected by the operator, Standard, Drift check or Nominal.

With all scan measurement types, options for Range and Zone are available. Range specifies where the system can search for the measurement point. A search or scan is conducted for the specified distance in both directions from the nominal value. It is shown by the long line 64 going through the center of the surface point location in FIG. 6. Zone gives the radius around the nominal position where a measurement will be accepted. It is shown by the two disks at the ends of the Range line.

The size for Zone measurement type is based on the surface that is being measured. If a narrow surface is being measured, the value must be small enough to only accept measurements on the surface for the point. If the surface is large and flat, a larger value for Zone is acceptable. For a Standard scan measurement type, the measurement is taken when the step is selected. For a Drift check scan measurement type, the measurement is taken at regular intervals. The time, in seconds, between measurements is specified by the interval. Drift check is optionally implemented at periodic intervals without additional operator input. This is particularly useful when the vehicle body is movable while located in the inspection booth 14.

Figure 7:
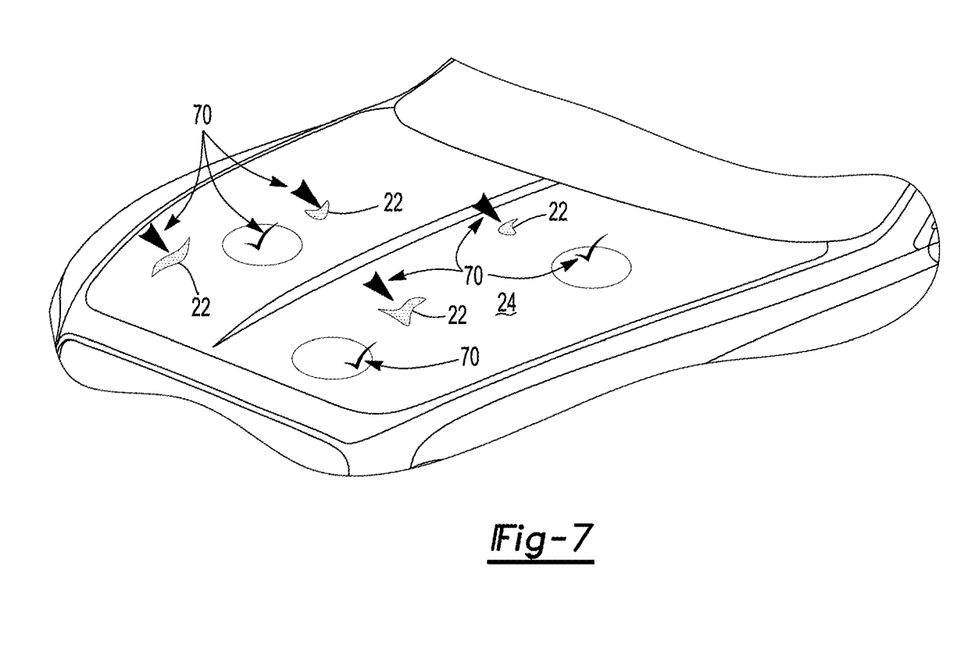
FIG. 7 shows identification icons projected onto a surface of a vehicle body.

When disposition of the vehicle body 14 is ascertained within the three-dimensional coordinate system, items 22 disposed upon a surface of the vehicle body can now be identified for the operator by laser scanning eliminating the need for the operator to visually search for the items 22. While any light source capable of projecting an icon 70 onto a surface with particular geometric accuracy, a laser projector 32 is particularly suited when a dual function of providing accurate measurements of targets, surfaces, and edges is established. Projection of icons 70 onto the vehicle surface is best represented in FIG. 7. As set forth above, an item identification system provided by Micro-Epsilon works cooperatively with laser projector once the item has been located in the three-dimensional coordinate system.

Figure 8:
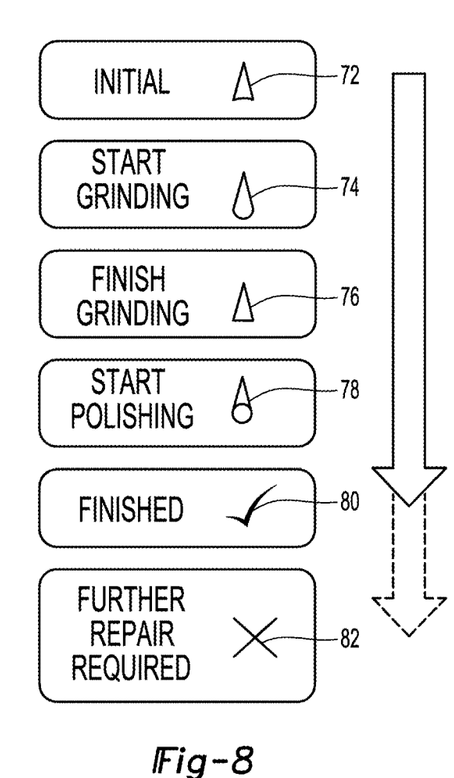
FIG. 8 shows a flow chart of a typical repair procedure as identified with projected icons.

Referring to FIG. 8, a stepwise flow chart is shown where the laser projector 32 first projects an indication icon 72 in the form of an arrow or chevron directed toward the item 22, in this case a paint defect. Due to the rapid scanning nature, multiple defects may be simultaneously identified. Once an operator indicates the item 22 has been identified, in one embodiment by placing a reflector in laser beam for returning the laser beam to the laser sensor 43, the projector 32 indicates process to be performed such as grinding with start repair icon 72. When complete, the projector 32 again detects reflection and scans a grinding complete icon 76 onto the surface at the location of the identified item. The projector follows by scanning a begin polishing icon 78 (or any other necessary task). When the projector detects the polishing is complete, a repair finished icon 80 is scanned onto the surface. When multiple defects are identified requiring multiple operators performing repairs, completion of the vehicle repair process is signaled when only complete icons are visible. Of course, the operator can indicate to the projector by movement or other reflective element that additional repair is required that is indicated by scanning an additional repair icon 84 at the location of the defect.

This process could still be confusing if there is no easy means for an operator to specify a change in state of a displayed location. As set forth above, defects may be distributed arbitrarily over a paint finish requiring an operator or operators to establish that the defect at the top right of the rear passenger door, for example, was repaired. To achieve this end, the internal sensor 43 employed in the laser projector to locate retro-reflective targets 36 to establish the projector position is utilized as a feedback mechanism. When the laser beam crosses a patch of retro-material a signal is recorded associated with the location icon that was traversed by the laser.

By placing a patch of retro-reflective material, for example, on the back of a glove that is moved into the path of the laser tracing the indicator, the system can then signal a transition to the next process state for that icon to the controller 28. Note that this operation is in context to a specific location icon 70 so there is no need to externally identify the relevant location and any number of operators can interact in this manner with the system simultaneously. The process state can be highlighted or summarized on a remote or local interface or controller screen 29 to dynamically show the progress of the task. Statistical information can be tabulated that can lead to a determination of the cause of defect. Using feedback of this nature can provide a fool-proof method of ensuring that the entire process is complete, for example, clearly indicating the completion state by varying the background color of the interface. In addition, for process control purposes, it is possible to track the time spent on various steps in the process, associate the difficulty in performing specific types of tasks or repairs and assess the efficiency of operators or the benefit of using various number of operators in a work team.

It should be understood by one of ordinary skill in the art that the invention of the present application is useable in a variety of manufacturing settings. For example, the invention may be employed in a stationary work sell. Further, the invention may be employed in a stationary work cell where the vehicle or other object being processed may be moveable in a vertical direction to assist operators performing processes. Still further, the invention may be employed in a booth having a moving assembly line where the vehicle, and sometimes the operator, is continuously moving.

What is claimed is:
1. A method of identifying a geometric location of an item on a surface of a workpiece identified by an optical device, comprising the steps of:
   providing a controller;
   providing an item identification system including a light projector and a photogrammetry system;

using at least one of said light projector and said photogrammetry system for generating a three-dimensional coordinate system within a work cell;

using at least one of said light projector and said photogrammetry system for identifying a location of the surface of the workpiece within the three-dimensional coordinates system;

said controller calibrating the location of the surface of the workpiece within the three-dimensional coordinate system with the identified item by identifying a first transform and a second transform relative to the surface of the workpiece with said second transform being more accurate than said first transform;

said controller calculating geometric location of the item on the surface of the workpiece in the three-dimensional coordinate system as identified by said optical device; and said controller signaling the light projector for projecting a beam of light onto the surface of the workpiece for identifying a disposition of the item disposed upon the surface of the workpiece.

2. The method set forth in claim 1, wherein said step of identifying a disposition of the item is further defined by identifying a location of the item on the surface of the workpiece with the beam of light projected by the light projector.

3. The method set forth in claim 1, wherein said step of identifying a disposition of the item on the surface of the workpiece is further defined by identifying a work function has been performed on the item identified on the surface of the workpiece.

4. The method set forth in claim 1, wherein said step of identifying a first transform is further defined by identifying a plurality of transforms being disposed in a hierarchy of importance.

5. The method set forth in claim 1, wherein said step of calibrating a location of the surface of the workpiece within the three-dimensional coordinate system is further defined by at least one of said light projector and said photogrammetry system identifying a feature of the surface of the workpiece and calibrating the feature within the three-dimensional coordinate system.

6. The method set forth in claim 4, wherein said step of identifying a feature of the surface of the workpiece is further defined by identifying the feature with a handheld probe and reflecting a light beam from the light source off the probe to one of the photogrammetry device or a light sensor disposed at said light source.

7. The method set forth in claim 1, wherein said step of providing a light projector and a photogrammetry device is further defined by providing a plurality of light projectors and a plurality of photogrammetry devices.

8. The method set forth in claim 1, wherein said step of generating a three-dimensional coordinate system within said work cell is further defined by placing a reference in a known location of said work cell and locating said reference with at least one of said light projector and said photogrammetry device.

9. The method set forth in claim 1, wherein said step of identifying an item on the surface of the workpiece is further defined by identifying a paint defect on a painted surface.

10. The method set forth in claim 9, wherein said step of identifying a disposition of the item disposed upon the surface of the workpiece is further defined by identifying if a repair of the paint defect has been performed.

* * * * *